United States Patent
Peng et al.

(10) Patent No.: US 12,280,899 B2
(45) Date of Patent: Apr. 22, 2025

(54) AIRCRAFT ATTITUDE TRACKING CONTROL METHOD, SYSTEM AND COMPUTER EQUIPMENT

(71) Applicant: Shenzhen Polytechnic University, Guangdong (CN)

(72) Inventors: Xuan Peng, Guangdong (CN); Shan Lu, Guangdong (CN); Zhijiang Lou, Guangdong (CN); Sen Xie, Guangdong (CN); Fengli Dai, Guangdong (CN)

( * ) Notice: Subject to any disclaimer, the term of this patent is extended or adjusted under 35 U.S.C. 154(b) by 0 days.

(21) Appl. No.: 18/970,747

(22) Filed: Dec. 5, 2024

(65) Prior Publication Data

US 2025/0091737 A1 Mar. 20, 2025

(30) Foreign Application Priority Data

Dec. 6, 2023 (CN) .......................... 202311664381.9

(51) Int. Cl.
*B64G 3/00* (2006.01)
*G05D 1/49* (2024.01)

(52) U.S. Cl.
CPC .................................. *B64G 3/00* (2013.01); *G05D 1/49* (2024.01)

(58) Field of Classification Search
None
See application file for complete search history.

(56) References Cited

U.S. PATENT DOCUMENTS

2015/0051755 A1* 2/2015 Erhart .................. G05D 1/0858 701/2

OTHER PUBLICATIONS

Xuan et al., Dual-quaternion-based modeling and control for motion tracking of a tumbling target for the kinematic and dynamic modeling equations, 2019, Journal of Systems Engineering and Electronics, pp. 985-994 (Year: 2019).*

CNIPA Application No. CN202311664381.9; First Office Action, dated Jun. 7, 2024, English machine translation generated Dec. 5, 2024, pp. 1-5.

CNIPA Application No. CN202311664381.9; First Office Action, dated Jun. 7, 2024, Original Chinese, pp. 1-4.

* cited by examiner

*Primary Examiner* — Jelani A Smith
*Assistant Examiner* — Davin Seol
(74) *Attorney, Agent, or Firm* — Addison D. Ault; IPGentleman Intellectual Property Servies, LLC

(57) ABSTRACT

The invention provides an aircraft attitude tracking control method, system and computer equipment, which belongs to the field of aircraft attitude control, comprising: obtaining aircraft operating parameters and establishing a kinematic model of the attitude tracking error of the aircraft. A specified time performance constraint function and attitude error boundary based on the hyperbolic cosecant composite function are then constructed. A constrained attitude error conversion function and its inverse function are utilized to obtain an unconstrained attitude tracking conversion error. Virtual control instructions are solved in kinematics using a sigmoid tracking differentiator to obtain a numerical derivative. The control moment in the dynamics is solved and the complete form of the attitude tracking algorithm is given for the aircraft attitude tracking system. This method provides a computationally efficient means of controlling aircraft to ensure that error convergence is achieved within a preset time.

10 Claims, 3 Drawing Sheets

AIRCRAFT ATTITUDE TRACKING CONTROL METHOD, SYSTEM AND COMPUTER EQUIPMENT

CROSS-REFERENCE TO RELATED APPLICATION

This application claims priority to Chinese Patent Application No. 202311664381.9, filed on Dec. 6, 2023 before the China National Intellectual Property Administration, the disclosure of which is incorporated herein by reference in entirety.

TECHNICAL FIELD

The present invention belongs to the technical field of attitude control of rigid body aircraft, and specifically relates to an aircraft attitude tracking control method, system and computer equipment.

BACKGROUND

With the advancement of technology and the continuous growth of mission requirements, aircraft and space missions have become increasingly complex and diversified, and mission types have gradually evolved from traditional single-aircraft missions such as earth observation and communication relay to emerging multi-aircraft cluster missions such as rendezvous, docking and formation flight. For all kinds of aircraft, effective attitude control is related to various flight processes such as aircraft take-off, landing and flight direction, and is an important foundation to ensure the smooth execution of various aerospace missions. Due to the relatively close relative distance between the aircraft in a swarm mission, for the sake of the mission time window and safety collision avoidance, it is necessary to pay attention not only to the final steady-state goal of attitude control, but also to transient performance characteristics such as convergence speed, overshoot, and trajectory boundary during the motion processes. Although the transient performance of the system can be adjusted by changing the parameters of traditional control methods, transient performance is not considered in the control design process. Thus, there is no theoretical framework to guarantee suitable transient performance, making it difficult to meet the requirements for the safety and reliability of attitude control in swarm aerospace missions.

Preset performance control is a convenient, effective and widely used method to achieve a priori constraints on transient performance such as overshoot and convergence time. However, there are two main problems in current implementations of preset performance attitude control of aircraft: (1) the traditional exponential performance constraint function has limitations of not enabling preset convergence time, requiring initial error information for the system, and not allowing fine adjustment of convergence speed. These functions have the characteristics of fast convergence speed in the initial stage, and large systematic error in the initial stage. Thus, it is easy to cause phenomena such as surge of initial control quantity and jitter, which then cause performance degradation or even instability of the closed-loop system. (2) Most of the existing control algorithm designs focus is on theoretical derivation results, and simulation tests are carried out on high-performance computers with abundant computing resources. However, available computing resources in actual airborne flight control systems are very limited, and most of the attitude control algorithms do not take into account the need for lightweight processing of calculations. Thus it is easy for a huge disparity between simulation test performance and practical application effects to emerge.

SUMMARY

In order to solve the problem of high-performance, robust practical aircraft attitude tracking control under the condition of limited computing resources, the present invention provides an aircraft attitude tracking control method, system and computer equipment, which is based on the composite hyperbolic cosecant composite function to carry out the design of an attitude tracking controller with preset performance at specified time, which can simultaneously solve the problems in existing methods of infinite theoretical convergence time, dependence on initial state information, and difficulty in adjusting convergence speed. Based on a sigmoid tracking differentiator, the method obtains the derivative information of the virtual control instruction in the backstep design, which can solve the problems of complex controller form and the sharp increase of online computation caused by the analytical derivation of existing methods.

In order to achieve the above purpose, the invention provides the following technical scheme:

An aircraft attitude tracking control method comprises the following steps:

Obtain the operating parameters of the aircraft;

Based on the operation parameters and quaternion description of the aircraft, the kinematic model and dynamic model of the attitude tracking error of the aircraft were established;

Based on the hyperbolic cosecant composite function, the performance constraint function of the specified time convergence is constructed, and the attitude tracking error constraint boundary is set based on the performance constraint function.

Construct a constrained attitude error conversion function based on the attitude tracking error constraint boundary, and solve the inverse function of the constrained attitude error conversion function to obtain the dynamic equation of the unconstrained attitude tracking conversion error.

According to the dynamic equation of the unconstrained attitude tracking conversion error and the kinematic model of the aircraft attitude tracking error, establish a dynamic equation of the unconstrained conversion.

Solve the virtual control instructions in the kinematic model based on the dynamic equation and the backstepping method of the unconstrained transformation error, and construct a Sigmoid tracking differentiator to obtain the numerical derivative of the virtual control instructions;

Wherein the control torque is designed based on the virtual control instructions and numerical derivatives, the actual control input is solved by the backstepping method in the dynamic model, and the control torque and the actual control input are used in the aircraft attitude tracking system to realize the aircraft attitude tracking control.

Preferably, the specific construction methods of the kinematic model and dynamic model of the aircraft attitude tracking error are as follows:

$F_I$ denotes the earth's inertial system, $F_B$ is the aircraft system, $F_D$ is the desired motion coordinate system, and the motion of the aircraft unit is expressed as $F_B$ relative to $F_I$ motion. The single body attitude kinematics model and dynamics model based on quaternion description are:

$$\dot{q}_B = \frac{1}{2}q_B\omega_B^B \tag{1}$$

$$J_B\dot{\omega}_B^B = -\omega_B^B \times J_B\omega_B^B + \tau^B \tag{2}$$

wherein, $q_B$ and $\omega_B^B$ are the attitude quaternion and angular velocity of the aircraft, $\dot{q}_B$ and $\dot{\omega}_B^B$ are the derivatives of the attitude quaternion and angular velocity of the aircraft, respectively, $J_B$ is the moment of inertia of the aircraft and $\tau^B$ is the control input torque;

Desired motion is described as $F_D$ relative to $F_I$ motion that satisfies:

$$\dot{q}_D = \frac{1}{2}q_D\omega_D^D \tag{3}$$

where $q_D$ and $\omega_D^D$ are the desired attitude and the desired angular velocity, respectively;

The tracking motion of the aircraft is described as the motion of $F_B$ relative to $F_D$. Based on formulas (1)-(3), the kinematic model and dynamic model of the aircraft attitude tracking error are established as follows:

$$\dot{q}_e = \frac{1}{2}q_e\omega_e^B \tag{4}$$

$$J_B\dot{\omega}_e^B = -\omega_B^B \times J_B\omega_B^B + J_B\left(C_e\dot{\omega}_D^D - \omega_e^B \times C_e\omega_D^D\right) + \tau^B \tag{5}$$

wherein, $q_e = [q_{e0}, q_e^T]^T$ is the attitude tracking error quaternion, $q_{e0}$ is the scalar part of the quaternion, $q_e = [q_{e1}, q_{e2}, q_{e3}]^T$ is the vector part of the quaternion, $\omega_e^B$ is the angular velocity tracking error, $J_B$ is the moment of inertia of the aircraft, $\omega_B^B$ is the angular velocity of the aircraft, $\omega_B^B$ and $\dot{\omega}_B^B$ are the expected angular velocity and angular acceleration respectively, $C_e$ is the rotation matrix, and $\tau^B$ is the control torque.

Preferably, the performance constraint function of the specified time convergence is constructed based on the hyperbolic cosecant composite function, and the attitude tracking error constraint boundary is set based on the performance constraint function, specifically:

Based on the hyperbolic cosecant composite function, a performance constraint function for the convergence of the specified time is constructed $\rho_i(t)$:

$$\rho_i(t) = \begin{cases} \operatorname{csch}\left(\rho_{i0} + \frac{r_i t}{T_i - t}\right) + \rho_{i\infty}, & 0 \le t < T_i \\ \rho_{i\infty}, & t < T_i \end{cases} \tag{6}$$

$$i = 1, 2, 3$$

wherein, t is the time variable, csch(•) is the hyperbolic cosecant composite function, $T_i$ is the specified convergence time, $\rho_{i0}$ is used to adjust the initial point of the boundary function, $r_i$ is used to adjust the convergence speed of the function, and $\rho_{i\infty}$ is the steady-state upper bound of the error;

Based on the performance constraint function, the attitude tracking error constraint boundary is designed as:

$$-\underline{\delta}_i\rho_i(t) < q_{ei} < \overline{\delta}_i\rho_i(t), \tag{7}$$

$$i = 1, 2, 3.$$

where $\underline{\delta}_i$ and $\overline{\delta}_i$ are the overshoot limit parameters, and $\underline{\delta}_i, \overline{\delta}_i \in (0,1]$, $q_{ei}$ are the corresponding components in the quaternion of the attitude tracking error.

Preferably, the constrained attitude error conversion function is constructed based on the attitude tracking error constraint boundary, and the inverse function of the constrained attitude error conversion function is solved to obtain a dynamic equation for the unconstrained attitude tracking conversion error, specifically:

Based on the boundary constraint of the attitude tracking error, the constrained attitude error conversion function is constructed, which is used to convert the constrained attitude tracking error into an unconstrained form, and the constrained attitude error conversion function S(•) is designed as follows $$S(\varepsilon_i) = \frac{\overline{\delta}_i e^{\varepsilon_i} - \underline{\delta}_i e^{-\varepsilon_i}}{e^{\varepsilon_i} + e^{-\varepsilon_i}}, \tag{8}$$

$$i = 1, 2, 3$$

wherein $\varepsilon_i$ is the unconstrained transformation error, and the constrained actual attitude error $q_{ei}$ and the unconstrained transformation error $\varepsilon_i$ satisfy:

$$q_{ei} = \rho_i S(\varepsilon_i), \tag{9}$$

$$i = 1, 2, 3$$

based on equation (9), the inverse function of the constrained attitude error conversion function $S^{-1}(\bullet)$ is solved to give an explicit expression of the transformation error:

$$\varepsilon_i = S^{-1}(z_i) = \frac{1}{2}\ln\left(\frac{z_i + \underline{\delta}_i}{\overline{\delta}_i - z_i}\right), \tag{10}$$

$$z_i = q_{ei}(t)/\rho_i(t),$$

$$i = 1, 2, 3$$

where $\varepsilon_i$ is the conversion error, and $z_i$ is the normalized conversion error.

Preferably, the dynamic equation of the unconstrained conversion error is established according to the dynamic equation of the unconstrained attitude tracking conversion error and the kinematic model of the aircraft attitude tracking error, specifically:

$$\dot{\varepsilon} = RQ_e\omega_e + v \tag{11}$$

where $\varepsilon = [\varepsilon_1, \varepsilon_2, \varepsilon_3]^T$ is the transformation error vector, $\dot{\varepsilon}$ represents the derivative of $\varepsilon$; $R = \operatorname{diag}[r_1, r_2, r_3]$, is a third-order diagonal matrix;

$$r_i = \frac{\partial S^{-1}}{\partial z_i} \cdot \frac{1}{\rho_i},$$

$$i = 1, 2, 3,$$

$$Q_e = \frac{q_{e0}I_3 + q_e^\times}{2},$$

$$v = [v_1, v_2, v_3]^T,$$

$$v_i = -r_i \frac{q_{ei}\rho_i}{\rho_i},$$

$$i = 1, 2, 3;$$

$S^{-1}$ is the inverse of the error conversion function, $r_i$ is an element in the diagonal matrix, $Q_e$ is the attitude multiplication matrix, $q_{e0}$ is the scalar part of the quaternion, $I_3$ is the third-order identity matrix, $q_e^\times$ is the attitude cross product matrix, $v$ is the auxiliary vector, and $v_i$ is an element in the auxiliary vector.

Preferably, the virtual control instructions of the kinematic loop are solved based on the dynamic equation and the backstepping method of the unconstrained conversion error, and a sigmoid tracking differentiator is constructed to obtain the numerical derivative of the virtual control instructions, specifically:

Based on the dynamic equation of the unconstrained transformation error, the virtual control instructions in the kinematic model are designed as:

$$\omega_{ec} = -Q_e^{-1} R^{-1}(k_p \varepsilon + v) \quad (12)$$

wherein $k_p>0$ is the control parameter, and the $-1$ in the upper right corner of the parameter represents the inversion.

To build a tracking differentiator based on sigmoid function:

$$\begin{cases} \dot{x}_1 = x_2 \\ \dot{x}_2 = -r^2 sig(x_1 - w; a_1, b_1) - sig(x_2/r; a_2 b_2) \end{cases},$$

$$sig(x; a, b) = a[(1 + e^{-bx})^{-1} - 0.5]$$

where sig(•) is the sigmoid function, $a_1, b_1, a_2, b_2>0$ is the design parameter, $r>0$ is the acceleration factor, $w$ is the reference signal input, and $x_1$ and $x_2$ are the two states of the tracking differentiator.

The sigmoid tracking differentiator is used to find the derivative of the virtual control command:

$$\begin{cases} \omega_{ecfi} = x_{\omega i} \\ \dot{x}_{\omega i} = r_i^2 [sig(\omega_{ecfi} - \omega_{eci}; a_{i1}, b_{i1}) + sig(x_{\omega i}/r_i; a_{i2} b_{i2})] \end{cases}, \quad (14)$$

$$i = 1, 2, 3$$

wherein $r_i, a_{i1}, a_{i2}, b_{i1}, b_{i2}>0$, $\omega_{ecf}=[\omega_{ec1}, \omega_{ec2}, \omega_{ec3}]^T$ and $\omega_{ecf}=[x_{\omega 1}, x_{\omega 2}, x_{\omega 3}]^T$ are the filtered signal and the filtered derivative of the virtual control command, respectively, and $x_{\omega i}$ is a state of the tracking differentiator.

Preferably, the control torque is designed based on the virtual control instruction and the numerical derivative, the actual control input quantity is solved by using the backstepping method in the dynamic model, and the control torque and the actual control input quantity are used in the aircraft attitude tracking system to realize the aircraft attitude tracking control, specifically:

Based on the virtual control instruction and its filtering signal, the angular velocity loop tracking error is defined as $z_\omega = \omega_e - \omega_{ecf}$, and its dynamic equation is:

$$\dot{z}_w = J_B^{-1}(-\omega_B^B \times J_B \omega_B^B - J_B(C_e \dot{\omega}_D^D - \omega_e^B \times C_e \omega_D^D)) + \tau^B \quad (16)$$

According to equation (16) and the principle of backstepping method, the control torque input $\tau^B$ is designed as:

$$\tau^B = -\Xi + J_B \dot{\omega}_{ecf} - k_d z_\omega - Q_e^T R^T \varepsilon \quad (17)$$

wherein $k_d>0$ is the control parameter, and $\Xi = -\omega_B^B \times J_B \omega_B^B - J_B(C_e \dot{\omega}_D^D = \omega_e^B \times C_e \omega_D^D)$ is the auxiliary variable;

Substituting the control torque input $\tau^B$ into the dynamical model, the closed-loop dynamics equation is as follows:

$$\dot{z}_\omega = -k_d z_\omega - Q_e^T R^T \varepsilon \quad (18)$$

The candidate Lyapunov equation for defining the overall closed-loop system is:

$$V = \frac{1}{2} \varepsilon^T \varepsilon + \frac{1}{2} z_\omega^T z_\omega \quad (19)$$

The derivative V along the trajectory of the closed-loop system can be obtained $\dot{V} = k_p \varepsilon^2 - k_d z_\omega^2 + \varepsilon^T R Q_e s$.

Preferably, the aircraft attitude tracking controller is:

$$\begin{cases} \omega_{ec} = -2Q_e^{-1} R^{-1}(k_p \varepsilon + v) \\ \{\omega_{ecfi} = x_{\omega i}, i = 1, 2, 3 \\ \dot{x}_{\omega i} = r_i^2 [sig(\omega_{ecfi} - \omega_{eci}; a_{i1}, b_{i1}) + sig(x_{\omega i}/r_i; a_{i2} b_{i2})] \\ \tau^B = -\Xi + J_B \dot{\omega}_{ecf} - k_d z_\omega - Q_e^T R^T \varepsilon \end{cases} \quad (20)$$

wherein $x_{\omega i}$ is a state of the tracking differentiator, $k_d$ is the control parameter and $\Xi$ is the auxiliary variable.

The invention also provides an aircraft attitude tracking control system, comprising:

The data acquisition module is used to obtain the operating parameters of the aircraft;

The model building block is used to establish the kinematic model and dynamic model of the aircraft attitude tracking error based on the aircraft operating parameters and quaternion description methods;

The constraint boundary setting module is used to construct the performance constraint function of the specified time convergence based on the hyperbolic cosecant composite function, and to set the constraint boundary of the attitude tracking error based on the performance constraint function;

The first dynamic equation is used to construct a constrained attitude error conversion function based on the attitude tracking error constraint boundary, and to solve the inverse function of the constrained attitude error conversion function to obtain a dynamic equation of the unconstrained attitude tracking conversion error;

The second dynamic equation is used to construct a model based on the dynamic equation of the unconstrained attitude tracking conversion error and the kinematic model of the aircraft attitude tracking error.

The derivative solving module is used for solving the virtual control instructions in the kinematic model based on the dynamic equation and the backstepping method of the unconstrained transformation error, and constructing a Sigmoid tracking differentiator to obtain the numerical derivative of the virtual control instructions;

The tracking module is used for designing the control moment based on the virtual control instruction and the numerical derivative, using the backstepping method to solve the actual control input quantity in the dynamic model, and using the control torque and the actual control input quantity for the aircraft attitude tracking system to realize the aircraft attitude tracking control.

The invention also provides a computer device, comprising a memory, a processor and a computer program stored on the memory, wherein the processor executes the computer program to realize any of the steps described in the aircraft attitude tracking control method.

The aircraft attitude tracking control method provided by the present invention has the following beneficial effects:

The attitude tracking algorithm in the present invention is designed based on the preset performance method, and the performance constraints are applied in advance in the controller design process, so as to theoretically ensure the constraint and adjustability of the transient and steady-state performance of the closed-loop system; The performance constraint function based on the composite hyperbolic cosecant is constructed, and the prior constraints of overshoot and steady-state error, the pre-specified convergence time and the fine adjustment of the convergence speed are realized at the same time, so as to ensure the strict controllability and smooth reliability of the whole tracking process. The Sigmoid tracking differentiator is used to derive the virtual control instructions in the backstep design, so as to realize the computational lightweight of the control algorithm and ensure its practical application performance in the airborne flight control system.

BRIEF DESCRIPTION OF THE DRAWINGS

In order to more clearly illustrate the embodiment of the present invention and its design scheme, the accompanying drawings required for the present embodiment will be briefly described below. The drawings described below are only partial embodiments of the present invention, and for those of ordinary skill in the art, other drawings may be obtained from these drawings without creative effort.

DETAILED DESCRIPTION OF EMBODIMENTS

In order to enable those skilled in the art to better understand the technical scheme of the present invention and to be able to implement it, the present invention is described in detail below in conjunction with the accompanying drawings and specific embodiments. The following embodiments are only used to more clearly illustrate the technical scheme of the present invention and cannot be used to limit the scope of protection of the present invention.

Embodiment 1

Figure 1:
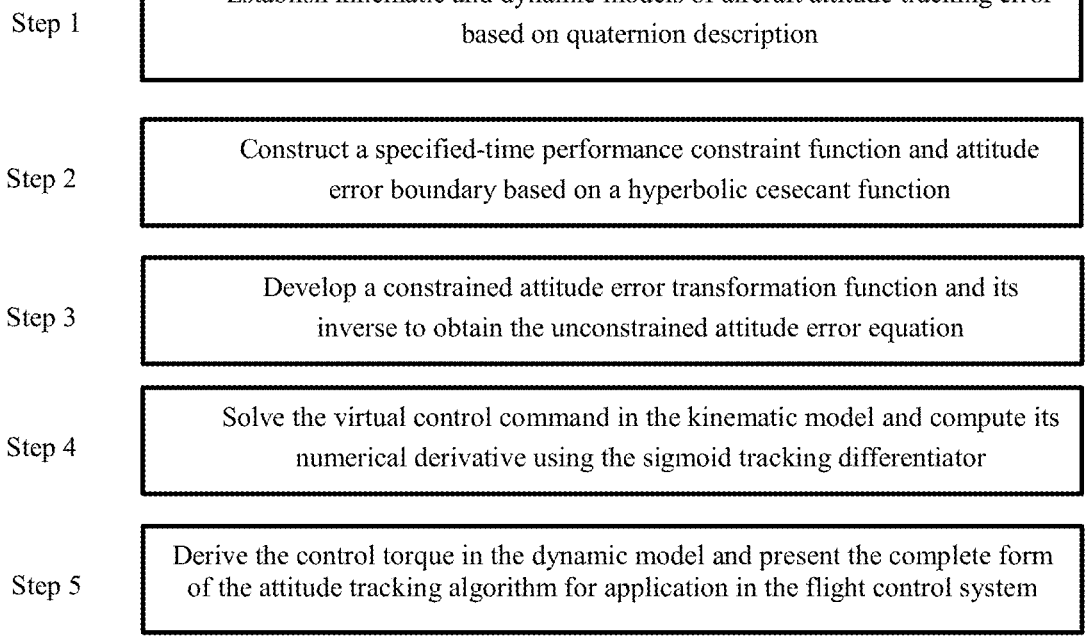
FIG. 1 is the flow chart of the aircraft attitude tracking control method of embodiment 1 of the present invention.
Figure 2:
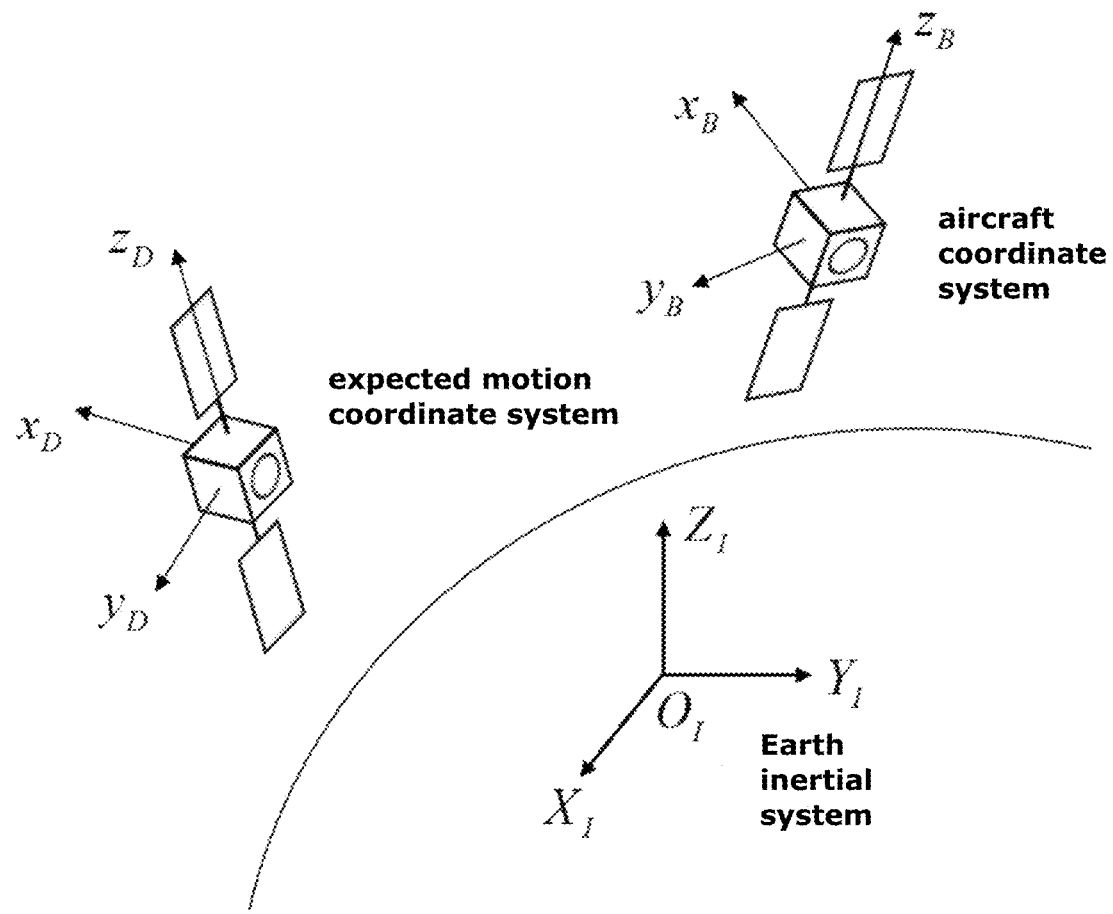
FIG. 2 is a schematic diagram of three coordinate systems used in the attitude tracking motion modeling in the present invention.
Figure 3:
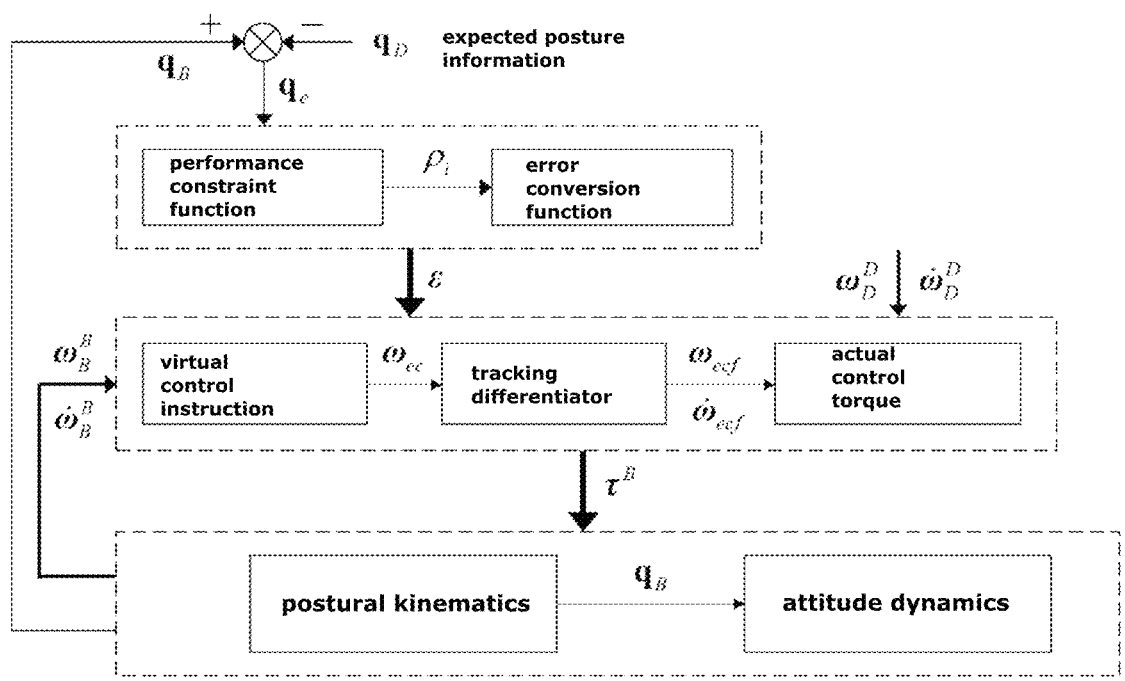
FIG. 3 is the closed-loop structure diagram of the lightweight specified time preset performance attitude tracking control system in the present invention.

The present invention provides an aircraft attitude tracking control method, as shown in FIG. 1 to FIG. 3, and comprises the following steps:

Step 1: Firstly, the aircraft operating parameters are obtained, and the kinematic model and dynamic model of the aircraft attitude tracking error based on the aircraft operating parameters and quaternion description are established.

In order to establish the aircraft attitude motion model (hereinafter referred to as the kinematic model), three coordinates are defined as shown in FIG. 2, in which the earth's inertial frame is denoted as $F_1$, the aircraft system is denoted as $F_B$ and the expected motion coordinate system is denoted as $F_D$. The motion of the aircraft unit is expressed as $F_B$. $F_1$ represents relative motion, and the kinematic model and dynamic model of the attitude of the vehicle based on the quaternion description are as follows $$\dot{q}_B = \frac{1}{2} q_B \omega_B^B \quad (1)$$

$$J_B \dot{\omega}_B^B = -\omega_B^B \times J_B \omega_B^B + \tau^B \quad (2)$$

wherein, $q_B$ and $\omega_B^B$ are the attitude quaternion and angular velocity of the aircraft, $\dot{q}_B$ and $\dot{\omega}_B^B$ are the derivatives of the attitude quaternion and angular velocity of the aircraft, respectively, $J_B$ is the moment of inertia of the aircraft and $\tau^B$ is the control input torque.

Desired motion is described as $F_D$ relative to $F_1$ motion that satisfies:

$$\dot{q}_D = \frac{1}{2} q_D \omega_D^D \quad (3)$$

where $q_D$ and $\omega_D^D$ are the desired attitude and the desired angular velocity, respectively;

The tracking motion of the aircraft is described as the motion of $F_B$ relative to $F_D$. Based on formulas (1)-(3), the kinematic model and dynamic model of the aircraft attitude tracking error are established as follows:

$$\dot{q}_e = \frac{1}{2} q_e \omega_e^B \quad (4)$$

$$J_B \dot{\omega}_e^B = -\omega_B^B \times J_B \omega_B^B + J_B (C_e \dot{\omega}_D^D - \omega_e^B \times C_e \omega_D^D) + \tau^B \quad (5)$$

wherein, $q_e = q_D^* q_B$ is the attitude tracking error quaternion, $q_{e0}$ is the scalar part of the quaternion, $q_e = [q_{e1}, q_{e2}, q_{e3}]^T$ is the vector part of the quaternion, $\omega_e^B = \omega_B^B - C_e \omega_D^D$ is the angular velocity tracking error, $C_e$ is the rotation matrix from $F_D$ to $F_B$, $\omega_D^D$ is the desired angular velocity, $\dot{\omega}_D^D$ is the is the desired attitude angular acceleration, $J_B$ is the moment of inertia of the aircraft, $\omega_B^B$ is the angular velocity of the aircraft, and $\tau^B$ is the control torque.

Step 2: Construct a specified time performance constraint function based on a hyperbolic cosecant composite function and a posture tracking error constraint boundary.

In order to achieve the goal of fine-tuning the convergence speed and pre-specifying the convergence time, a performance constraint function based on a piecewise composite hyperbolic cosecant composite function is constructed:

$$\rho_i(t) = \begin{cases} csch\left(\rho_{i0} + \dfrac{r_i t}{T_i - t}\right) + \rho_{i\infty}, & 0 \le t < T_i \\ \rho_{i\infty} & t < T_i \end{cases}, i = 1, 2, 3 \quad (6)$$

wherein, t is the time variable, csch(•) is the hyperbolic cosecant composite function, $T_i$ is the specified convergence time, $\rho_{i0}$ is used to adjust the initial value of the performance constraint function; with the help of the properties of the hyperbolic cosecant composite function, $$\lim_{\rho_{i0} \to 0} csch(0) = +\infty$$

we can design a sufficiently small $\rho_{i0}$ to make the initial value of the performance constraint function sufficiently large, thereby ensuring that the initial conditions are always met and eliminating the dependence on the initial state of the system.

Based on the performance constraint function, the attitude tracking error constraint boundary is designed as:

$$-\underline{\delta_i}\rho_i(t) < q_{ei} < \overline{\delta_i}\rho_i(t), i = 1, 2, 3. \quad (7)$$

where $\underline{\delta_i}$ and $\overline{\delta_i}$ are the overshoot limit parameters, and $\underline{\delta_i}, \overline{\delta_i} \in (0,1]$, which is used to adjust the maximum boundary of the attitude tracking error, is the overshoot of the adjustment convergence process, and $q_{ei}$ is the corresponding component in the quaternion of the attitude tracking error.

Step 3: Construct the constrained attitude error conversion function and its inverse function to obtain the dynamic equation of the unconstrained attitude tracking conversion error.

Based on the boundary constraint of the attitude tracking error constraint set in the second step, a constrained attitude error conversion function is constructed to convert the constrained attitude tracking error into an unconstrained form, and the constrained attitude error conversion function S(•) is designed as follows $$S(\varepsilon_i) = \dfrac{\overline{\delta_i}e^{\varepsilon_i} - \underline{\delta_i}e^{-\varepsilon_i}}{e^{\varepsilon_i} + e^{-\varepsilon_i}}, i = 1, 2, 3 \quad (8)$$

wherein $\varepsilon_i$ is the unconstrained transformation error, and the constrained actual attitude error $q_{ei}$ and the unconstrained transformation error $\varepsilon_i$ satisfy:

$$q_{ei} = \rho_i S(\varepsilon_i), i = 1, 2, 3 \quad (9)$$

Based on equation (9), the inverse function of the constrained attitude error conversion function $S^{-1}(•)$ is solved to give the explicit expression of the transformation error:

$$\varepsilon_i = S^{-1}(z_i) = \dfrac{1}{2}\ln\left(\dfrac{z_i + \underline{\delta_i}}{\overline{\delta_i} - z_i}\right), z_j = q_{ei}(t)/\rho_i(t), i = 1, 2, 3 \quad (10)$$

where $\varepsilon_i$ is the conversion error, and $z_i$ is the normalized conversion error.

Combined with the kinematic model of the attitude tracking error of the aircraft established in the first step, the dynamic equation of the unconstrained conversion error is established:

$$\dot{\varepsilon} = RQ_e\omega_e + v \quad (11)$$

where $\varepsilon = [\varepsilon_1, \varepsilon_2, \varepsilon_3]^T$ is the transformation error vector, Ė represents the derivative of ε; R=diag[$r_1$, $r_2$, $r_3$], is a third-order diagonal matrix;

$$r_i = \dfrac{\partial S^{-1}}{\partial z_i} \cdot \dfrac{1}{\rho_i},$$

$$i = 1, 2, 3, Q_e = \dfrac{q_{e0}I_3 + q_e^\times}{2}, v = [v_1, v_2, v_3]^T, v_i = -r_i\dfrac{q_{ei}\dot\rho_i}{\rho_i}, i = 1, 2, 3;$$

$S^{-1}$ is the inverse of the error conversion function, $r_i$ is an element in the diagonal matrix, $Q_e$ is the attitude multiplication matrix, $q_{e0}$ is the scalar part of the quaternion, $I_3$ is the third-order identity matrix, $q_e^\times$ is the attitude cross product matrix, v is the auxiliary vector, and $v_i$ is an element in the auxiliary vector.

Based on the dynamic equation of the unconstrained conversion error given in the third step, the virtual control instructions in the kinematic model are designed as follows:

$$\omega_{ec} = -Q_e^{-1}R^{-1}(k_p\varepsilon + v) \quad (12)$$

wherein $k_p > 0$ is a control parameter.

In order to obtain the derivatives of virtual control instructions and reduce the burden of online computation, a tracking differentiator based on Sigmoid function is constructed:

$$\begin{cases} \dot{x}_1 = x_2 \\ \dot{x}_2 = -r^2 sig(x_1 - w; a_1,, sig(x; a, b) = a\left[\left(1 + e^{-bx}\right)^{-1} - 0.5\right]. \\ b_1) - (sig(x_2/r; a_2 b_2) \end{cases} \quad (13)$$

where sig(•) is the sigmoid function, $a_1$, $b_1$, $a_2$, $b_2 > 0$ is the design parameter, r>0 is the acceleration factor, w is the reference signal input, and $x_1$ and $x_2$ are the two states of the tracking differentiator. In order to ensure the best performance of the tracking differentiator, the following parameter adjustment rules are followed: first, gradually increase r to obtain the desired tracking accuracy; secondly, gradually increase $a_1$ and $b_1$ to ensure stability and speed with no overshoot; finally, gradually reduce $a_2$ and $b_2$ to obtain optimal dynamic performance. Under the action of this tracking differentiator, there are:

$$\lim_{t \to \infty} x_1 = w, \lim_{t \to \infty} x_2 = \dot{w},$$

i.e., $x_1$ asymptotic convergence to the reference signal and w, $x_2$ asymptotically converge to the reference signal derivative $\dot{w}$.

The sigmoid tracking differentiator is used to obtain the derivative signal of the virtual control instruction in the following form:

$$\begin{cases} \dot{\omega}_{ecfi} = x_{\omega i} \\ \dot{x}_{\omega i} = r_i^2 \left[ sig(\omega_{ecfi} - \omega_{eci}; a_{i1}, b_{i1}) + sig(x_{\omega i}/r_i; a_{i2}b_{i2}) \right] \end{cases}, i = 1, 2, 3 \quad (14)$$

wherein $r_i, a_{i1}, a_{i2}, b_{i1}, b_{i2} > 0$, $\omega_{ecf} = [\omega_{ec1}, \omega_{ec2}, \omega_{ec3}]^T$ and $\dot{\omega}_{ecf} = [x_{\omega 1}, x_{\omega 2}, x_{\omega 3}]^T$ are the filtered signal and the filtered derivative of the virtual control command, respectively, and $x_{\omega i}$ is a state of the tracking differentiator.

Where $s = \omega_{ecf} - \omega_{ec}$ is denoted as the filter estimation error and $z_\omega = \omega_e - \omega_{ecf}$ is the angular velocity tracking error, then the dynamic equation that constrains the conversion error can be written as:

$$\dot{\varepsilon} = -k_p \varepsilon + RQ_e s + RQ_e z_\omega \quad (15)$$

Step 5: Solve the control moment in the dynamic model and give the complete form of the attitude tracking algorithm for use in the flight control system.

Based on the virtual control command and its filtering information given in the fourth step, the angular velocity tracking error is defined as $z_\omega = \omega_e - \omega_{ecf}$, and its dynamic equation is as follows:

$$\dot{z}_w = J_B^{-1} \left( -\omega_B^B \times J_B \omega_B^B - J_B (C_e \dot{\omega}_D^D - \omega_e^B \times C_e \omega_D^D) + \tau^B \right) \quad (16)$$

According to the above derivation and the principle of backstep, the control torque input $\tau^B$ is designed as:

$$\tau^B = -\Xi + J_B \dot{\omega}_{ecf} - k_d z_\omega - Q_e^T R^T \varepsilon \quad (17)$$

wherein $k_d > 0$ is the control parameter, and $\Xi = -\omega_B^B \times J_B \omega_B^B - J_B (C_e \omega_D^D - \omega_e^B \times C_e \omega_D^D)$ is the auxiliary variable.

Substituting the control torque input $\tau^B$ into the dynamics model yields the closed-loop dynamics equation as follows:

$$\dot{z}_\omega = -k_d z_\omega - Q_e^T R^T \varepsilon \quad (18)$$

The candidate Lyapunov equation for defining the overall closed-loop system is:

$$V = \frac{1}{2} \varepsilon^T \varepsilon + \frac{1}{2} z_\omega^T z_\omega \quad (19)$$

The derivative V along the trajectory of the closed-loop system can be obtained $\dot{V} = k_p \varepsilon^2 - k_d z_\omega^2 + \varepsilon^T RQ_e s$. According to the nature of the sigmoid tracking differentiator, $$\lim_{t \to \infty} s = 0,$$

so $\varepsilon$ and $z_\omega$ are ultimately bounded. The attitude tracking error of the aircraft converges at a specified time and satisfies the requirements of the performance constraint function according to the backstepping method and the basic principle of preset performance control.

Finally, the complete form of the proposed lightweight aircraft attitude tracking controller with preset performance at specified time is given:

$$\begin{cases} \omega_{ec} = -2Q_e^{-1} R^{-1} (k_p \varepsilon + v) \\ \dot{\omega}_{ecfi} = x_{\omega i}, i = 1, 2, 3 \\ \dot{x}_{\omega i} = r_i^2 \left[ sig(\omega_{ecfi} - \omega_{eci}; a_{i1}, b_{i1}) + sig(x_{\omega i}/r_i; a_{i2} b_{i2}) \right] \\ \tau^B = -\Xi + J_B \dot{\omega}_{ecf} - k_d z_\omega - Q_e^T R^T \varepsilon \end{cases} \quad (20)$$

wherein, $x_{\omega i}$ is a state of the tracking differentiator, $k_d$ is the control parameter and $\Xi$ is the auxiliary variable.

The aircraft attitude tracking control method in the present invention consists of a virtual control law (7), tracking differentiator (10), and the actual control torque (12). It is used in the aircraft motion control system to achieve high-performance attitude tracking control under the limitation of computing resources.

Based on the same invention concept, the invention also provides an aircraft attitude tracking control system, which comprises a data acquisition module, a model building module, a constraint boundary setting module, a first dynamic equation construction model, a second dynamic equation construction model, a derivative solving module and a tracking module.

Specifically, the data acquisition module is used to obtain the operating parameters of the aircraft. The model building module is used to establish the kinematic model and dynamic model of the aircraft attitude tracking error based on the aircraft operating parameters and quaternion description. The constraint boundary setting module is used to construct the performance constraint function of the specified time convergence based on the hyperbolic cosecant composite function, and set the constraint boundary of the attitude tracking error based on the performance constraint function. the first dynamic equation construction model is used to construct a constrained attitude error conversion function based on the constraint boundary of the attitude tracking error, and to solve the inverse function of the constrained attitude error conversion function to obtain a dynamic equation of the unconstrained attitude tracking conversion error. The second dynamic equation construction model is used to establish the dynamic equation of unconstrained conversion error according to the dynamic equation of the unconstrained attitude tracking conversion error and the kinematic model of the aircraft attitude tracking error. the derivative solving module is used for solving the virtual control instructions in the kinematic model based on the dynamic equation and the backstepping method of the unconstrained transformation error, and constructs a Sigmoid tracking differentiator to obtain numerical derivatives for the virtual control instructions. The tracking module is used to design the control moment based on the virtual control instruction and the numerical derivative, uses the backstepping method to solve the actual control input quantity in the dynamic model, and applies the control torque and the actual control input quantity to the aircraft attitude tracking system to realize the aircraft attitude tracking control.

Each module in the aircraft attitude tracking control system can be realized in whole or in part through software, hardware and a combination thereof. Each module can be embedded in or independent of the processor in the computer equipment in the form of hardware, or can be stored in the memory in the computer device in the form of software, so that the processor can be called to perform the corresponding operations of each of the above modules.

At the same time, the invention also provides a computer device, comprising a memory, a processor and a computer program stored on the memory, and the processor executes the steps in the embodiment of the aircraft attitude tracking control method for implementing the computer program. The specific implementation method can be found in the method embodiment, which will not be repeated here.

Those skilled in the art should understand that embodiments of the present invention may be provided as a process, system, or computer program product. Therefore, the present invention may take the form of a complete hardware embodiment, a complete software embodiment, or a combination of software and hardware embodiments. Moreover, the invention may take the form of a computer program product implemented on one or more computer-available storage media (including, but not limited to, disk memory, CD-ROM, optical memory, etc.) containing computer-available program code.

The present invention is described with reference to a flow diagram and/or block diagram of a method, device (system) and computer program product according to an embodiment of the present invention. It should be understood that each process and/or box in the flowchart and/or block diagram, as well as the combination of the process and/or box in the flowchart and/or block diagram, can be implemented by computer program instructions. These computer program instructions may be provided to the processor of a general-purpose computer, a specialized computer, an embedded processing machine, or other programmable data processing device to produce a machine such that the instructions executed by the processor of the computer or other programmable data processing device produce a device for implementing the functions specified in one or more processes and/or block diagrams, one or more boxes.

These computer program instructions may also be stored in computer-readable memory capable of directing a computer or other programmable data-processing device to work in a particular manner such that the instructions stored in the computer-readable memory result in a manufactured product comprising a directive device that implements the functions specified in a flowchart process or processes and/or block diagram boxes or boxes.

These computer program instructions may also be loaded onto a computer or other programmable data processing device such that a series of operational steps are performed on the computer or other programmable device to produce computer-implemented processing, so that the instructions executed on the computer or other programmable device provide steps for implementing the function specified in a flowchart process or processes and/or block diagram boxes or boxes.

It should be noted that the specific embodiments described above may enable those skilled in the art to understand the invention more comprehensively, but do not limit the invention in any way. Therefore, although the present specification and embodiments have described the invention in detail, those skilled in the art should understand that the present invention may still be modified or equivalent replaced; And all technical solutions and improvements that do not deviate from the spirit and scope of the present invention are covered by the scope of protection of the patent for the present invention. Any drawing mark in the claims shall not be deemed to be a limitation of the claims to which it relates.

What is claimed is:

1. A method for aircraft attitude tracking control, characterized by comprising the following steps:
   acquire aircraft operating parameters;
   establish a kinematic model and a dynamic model of an aircraft attitude tracking error based on the aircraft operating parameters and a quaternion description;
   construct a performance constraint function that converges at a specified time based on a hyperbolic cosecant composite function, and set an attitude tracking error constraint boundary based on the performance constraint function;
   construct a constrained attitude error conversion function based on the attitude tracking error constraint boundary, and solve an inverse function of the constrained attitude error conversion function to obtain a dynamic equation of an unconstrained attitude tracking conversion error;
   according to the dynamic equation of the unconstrained attitude tracking conversion error and the kinematic model of the aircraft attitude tracking error, establish a dynamic equation of an unconstrained conversion error;
   solve one or more virtual control instructions in the kinematic model based on the dynamic equation of the unconstrained conversion error and a backstepping method, and construct a sigmoid tracking differentiator to obtain a numerical derivative of the virtual control instructions;
   design a control torque based on the virtual control instructions and the numerical derivative, use the backstepping method to solve the actual control input in the dynamic model, and use the control torque and the actual control input in an aircraft attitude tracking system to realize aircraft attitude tracking control.

2. The aircraft attitude tracking control method of claim 1, wherein the kinematic model and the dynamic model of the aircraft attitude tracking error are constructed as follows:
   taking $F_I$ as the earth's inertial system, $F_B$ as an aircraft system, and $F_D$ as an expected motion coordinate system, a motion of an aircraft is expressed as a motion of $F_B$ relative to $F_I$ and the kinematic model and the dynamic model of the aircraft attitude error based on the quaternion description are, respectively:

$$\dot{q}_B = \frac{1}{2} q_B \omega_B^B \qquad (1)$$

$$J_B \dot{\omega}_B^B = -\omega_B^B \times J_B \omega_B^B + \tau^B \qquad (2)$$

wherein, $q_B$ and $\omega_B^B$ are an attitude quaternion and angular velocity of the aircraft, $\dot{q}_B$ and $\dot{\omega}_B^B$ are derivatives of the attitude quaternion and angular velocity of the aircraft, respectively, $J_B$ is a moment of inertia of the aircraft and $\tau^B$ is a control input torque;
desired motion is described as a motion of $F_D$ relative to $F_I$ satisfying:

$$\dot{q}_D = \frac{1}{2} q_D \omega_D^D \qquad (3)$$

where $q_D$ and $\omega_D^D$ are a desired attitude and a desired angular velocity, respectively;

wherein an aircraft tracking motion is described as the motion of $F_B$ relative to $F_D$;

based on formulas (1)-(3), the kinematic model and dynamic model of the aircraft attitude tracking error are established as follows:

$$\dot{q}_e = \frac{1}{2} q_e \omega_e^B \tag{4}$$

$$J_B \dot{\omega}_e^B = -\omega_B^B \times J_B \omega_B^B + J_B(C_e \dot{\omega}_D^D - \omega_e^B \times C_e \omega_D^D) + \tau^B \tag{5}$$

wherein, $q_e = [q_{e0}, q_e^T]^T$ is an attitude tracking error quaternion, $q_{e0}$ is a scalar part of the attitude tracking error quaternion, $q_e = [q_{e1}, q_{e2}, q_{e3}]^T$ is a vector part of the quaternion, $\omega_e^B$ is the angular velocity tracking error, $J_B$ is the moment of inertia of the aircraft, $\omega_B^B$ is an angular velocity of the aircraft, $\omega_D^D$ and $\dot{\omega}_D^D$ are an expected angular velocity and an angular acceleration respectively, $C_e$ is a rotation matrix, and $\tau^B$ is the control torque.

3. The aircraft attitude tracking control method of claim 2, wherein the performance constraint function of the specified time convergence is constructed based on the hyperbolic cosecant composite function, and the attitude tracking error constraint boundary is set based on the performance constraint function, specifically:

based on the hyperbolic cosecant composite function, the performance constraint function for the convergence at the specified time is constructed $\rho_i(t)$:

$$\rho_i(t) = \begin{cases} \operatorname{csch}\left(\rho_{i0} + \frac{r_i t}{T_i - t}\right) + \rho_{i\infty}, & 0 \le t < T_i \\ \rho_{i\infty} & t < T_i \end{cases}, i = 1, 2, 3 \tag{6}$$

wherein, t is a time variable, csch(•) is the hyperbolic cosecant composite function, $T_i$ is the specified convergence time, $\rho_{i0}$ is used to adjust the initial point of the boundary function, $r_i$ is used to adjust a convergence speed of the performance constraint function, and $\rho_{i\infty}$ is the steady-state upper bound of the attitude tracking error;

based on the performance constraint function, the attitude tracking error constraint boundary is designed as:

$$-\underline{\delta}_i \rho_i(t) < q_{ei} < \bar{\delta}_i \rho_i(t), i = 1, 2, 3 \tag{7}$$

where $\underline{\delta}_i$ and $\bar{\delta}_i$ are the overshoot limit parameters, and $\underline{\delta}_i$, $\bar{\delta}_i \in (0,1]$, $q_{ei}$ are the corresponding components in the quaternion of the attitude tracking error.

4. The aircraft attitude tracking control method of claim 3, wherein the constrained attitude error conversion function is constructed based on the attitude tracking error constraint boundary, and the inverse function of the constrained attitude error conversion function is solved to obtain the dynamic equation of the unconstrained attitude tracking conversion error, specifically:

based on the constraint boundary of the attitude tracking error, the constrained attitude error conversion function is constructed, which is used to convert the constrained attitude tracking error into an unconstrained form, and the constrained attitude error conversion function S(•) is designed as follows $$S(\varepsilon_i) = \frac{\bar{\delta}_i e^{\varepsilon_i} - \underline{\delta}_i e^{-\varepsilon_i}}{e^{\varepsilon_i} + e^{-\varepsilon_i}}, i = 1, 2, 3 \tag{8}$$

wherein $\varepsilon_i$ is the unconstrained transformation error, wherein the constrained actual attitude error $q_{ei}$ and the unconstrained transformation error $\varepsilon_i$ satisfy:

$$q_{ei} = \rho_i S(\varepsilon_i), i = 1, 2, 3 \tag{9}$$

based on equation (9), the inverse function of the constrained attitude error conversion function $S^{-1}(\bullet)$ is solved to give an explicit expression of the unconstrained transformation error:

$$\varepsilon_i = S^{-1}(z_i) = \frac{1}{2} \ln\left(\frac{z_i + \underline{\delta}_i}{\bar{\delta}_i - z_i}\right), z_i = q_{ei}(t)/\rho_i(t), i = 1, 2, 3 \tag{10}$$

where $\varepsilon_i$ is the unconstrained tranformation error, and $z_i$ is the normalized transformation error.

5. The aircraft attitude tracking control method of claim 4, wherein a dynamic equation of the unconstrained attitude tracking conversion error and the kinematic model of the aircraft attitude tracking error are established, specifically:

$$\dot{\varepsilon} = RQ_e \omega_e + v \tag{11}$$

where $\varepsilon = [\varepsilon_1, \varepsilon_2, \varepsilon_3]^T$ is a transformation error vector, $\dot{\varepsilon}$ represents the derivative of $\varepsilon$; $R = \operatorname{diag}[r_1, r_2, r_3]$, is a third-order diagonal matrix;

$$r_i = \frac{\partial S^{-1}}{\partial z_i} \cdot \frac{1}{\rho_i}, i = 1, 2, 3, Q_e = \frac{q_{e0} I_3 + q_e^\times}{2},$$

$$v = [v_1, v_2, v_3]^T, v_i = -r_i \frac{q_{ei} \dot{\rho}_i}{\rho_i}, i = 1, 2, 3;$$

$S^{-1}$ is an inverse of the constrained error conversion function, $r_i$ is an element in the third-order diagonal matrix, $Q_e$ is an attitude multiplication matrix, $q_{e0}$ is scalar part of the attitude tracking error quaternion, $I_3$ is a third-order identity matrix, $q_e^\times$ is the attitude cross product matrix, $v$ is an auxiliary vector, and $v_i$ is an element in the auxiliary vector.

6. The aircraft attitude tracking control method of claim 5, wherein virtual control instruction of the kinematic loop are solved based on a dynamic equation and a backstepping method of the unconstrained transformation error, and a sigmoid tracking differential is constructed to obtain the numerical derivative of the virtual control instructions, specifically:

based on the dynamic equation of the backstepping method of the unconstrained transformation error, the virtual control instructions in the kinematic model are designed as:

$$\omega_{ec} = -Q_e^{-1}R^{-1}(k_p\varepsilon + v) \quad (12)$$

wherein $k_p>0$ is a control parameter, and the $-1$ in the upper right corner of the control parameter represents the inversion of the control parameter;

wherein, to build a tracking differentiator based on a sigmoid function:

$$\begin{cases} \dot{x}_1 = x_2 \\ \dot{x}_2 = -r^2 sig(x_1 - w; a_1, b_1) - sig(x_2/r; a_2 b_2) \end{cases}, \quad (13)$$

$$sig(x; a, b) = a\left[(1 + e^{-bx})^{-1} - 0.5\right] \quad (15)$$

where $sig(\cdot)$ is the sigmoid function, $a_1$, $b_1$, $a_2$, $b_2>0$ is a design parameter, $r>0$ is an acceleration factor, $w$ is a reference signal input, and $x_1$ and $x_2$ are two states of the sigmoid tracking differentiator;

wherein the sigmoid tracking differentiator is used to find the numerical derivative of the virtual control instructions:

$$\begin{cases} \dot{\omega}_{ecfi} = x_{\omega i} \\ \dot{x}_{\omega i} = r_i^2\left[sig(\omega_{ecfi} - \omega_{eci}; a_{i1}, b_{i1}) + sig(x_{\omega i}/r_i; a_{i2}b_{i2})\right] \end{cases}, i = 1, 2, 3 \quad (14)$$

wherein $r_i$, $a_{i1}$, $a_{i2}$, $b_{i1}$, $b_{i2}>0$, $\omega_{ecf}=[\omega_{ec1}, \omega_{ec2}, \omega_{ec3}]^T$ and $\omega_{ecf}=[x_{\omega 1}, x_{\omega 2}, x_{\omega 3}]^T$ are a filtered signal and a filtered derivative of the virtual control instructions, respectively, and $x_{\omega i}$ is a state of the sigmoid tracking differentiator.

7. The aircraft attitude tracking control method of claim 1, wherein the control torque is designed based on a virtual control instruction and a numerical derivative of the virtual control instruction, wherein an actual control input quantity is solved by using the backstepping method of the unconstrained transformation error, and the control torque and the actual control input quantity are used in the aircraft attitude tracking system to realize the aircraft attitude tracking control, specifically:

based on the virtual control instruction and a filtering signal, an angular velocity loop tracking error is defined as $z_\omega = \omega_e - \omega_{ecf}$, and a dynamic equation of the angular velocity loop tracking error is:

$$\dot{z}_w = J_B^{-1}\left(-\omega_B^B \times J_B\omega_B^B - J_B(C_e\dot{\omega}_D^D - \omega_e^B \times C_e\omega_D^D) + \tau^B\right) \quad (16)$$

wherein, according to equation (16) and the backstepping method of the unconstrained transformation error, the control torque input $\tau^B$ is designed as:

$$\tau^B = -\Xi + J_B\dot{\omega}_{ecf} - k_d z_\omega - Q_e^T R^T \varepsilon \quad (17)$$

wherein $k_d>0$ is a control parameter, and $\Xi=-\omega_B^B \times J_B\omega_B^B - J_B(C_e\dot{\omega}_e^B \times C_e\omega_D^D)$ is an auxiliary variable;

substituting the control torque input $\tau^B$ into dynamic model, wherein a closed-loop dynamics equation is as follows:

$$\dot{z}_\omega = -k_d z_\omega - Q_e^T R^T \varepsilon \quad (18)$$

wherein a candidate Lyapunov equation for defining the overall closed-loop system is:

$$V = \frac{1}{2}\varepsilon^T \varepsilon + \frac{1}{2}z_\omega^T z_\omega \quad (19)$$

wherein a derivative $V$ along a trajectory of the closed-loop system can be obtained $\dot{V}=-k_p\varepsilon^2-k_d z_\omega^2+\varepsilon^T RQ_e s$.

8. The aircraft attitude tracking control method of claim 1, wherein the aircraft attitude tracking controller is:

$$\begin{cases} \omega_{ec} = -2Q_e^{-1}R^{-1}(k_p\varepsilon + v) \\ \begin{cases} \dot{\omega}_{ecfi} = x_{\omega i}, i = 1, 2, 3 \\ \dot{x}_{\omega i} = r_i^2\left[sig(\omega_{ecfi} - \omega_{eci}; a_{i1}, b_{i1}) + sig(x_{\omega i}/r_i; a_{i2}b_{i2})\right] \end{cases} \\ \tau^B = -\Xi + J_B\dot{\omega}_{ecf} - k_d z_\omega - Q_e^T R^T \varepsilon \end{cases} \quad (20)$$

wherein, $x_{\omega i}$ is a state of the tracking differentiator, $k_d$ is a control parameter and $\Xi$ is an auxiliary variable.

9. An aircraft attitude tracking control system, comprising:

a data acquisition module configured to obtain operating parameters of the aircraft;

wherein, a model building block is used to establish a kinematic model and a dynamic model of an aircraft attitude tracking error based on the aircraft operating parameters and quaternion description methods;

a constraint boundary setting module is used to construct a performance constraint function of a specified time convergence based on a hyperbolic cosecant composite function, and to set a constraint boundary of the attitude tracking error based on the performance constraint function;

a first dynamic equation is used to construct a constrained attitude error conversion function based on the attitude tracking error constraint boundary, and to solve an inverse function of a constrained attitude error conversion function to obtain a dynamic equation of an unconstrained attitude tracking conversion error;

wherein, a second dynamic equation is used to construct a model based on a dynamic equation of an unconstrained attitude tracking conversion error and the kinematic model of the aircraft attitude tracking error;

wherein, a derivative solving module is used for solving virtual control instructions in the kinematic model based on a dynamic equation and a backstepping method of an unconstrained transformation error, and constructing a sigmoid tracking differentiator to obtain a numerical derivative of the virtual control instructions;

wherein, a tracking module is used for designing the control torque based on the virtual control instructions and the numerical derivative, using the backstepping method to solve an actual control input quantity in the dynamic model, and using the control torque and the actual control input quantity for the aircraft attitude tracking system to realize aircraft attitude tracking control.

10. A computer device comprising a non-transient memory, a processor and a computer program stored on the memory, wherein the processor executes the steps of a computer program configured to realize the method of claim 1.

* * * * *